United States Patent
Lee et al.

(10) Patent No.: US 7,240,434 B2
(45) Date of Patent: Jul. 10, 2007

(54) STAGE APPARATUS

(75) Inventors: Suk-won Lee, Kunpo-si (KR); Byung-il Ahn, Seoul (KR); Dong-woo Kang, Daejeon (KR); Ki-hyun Kim, Daejeon (KR); Dae-gab Gweon, Daejeon (KR); Dong-min Kim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/050,761

(22) Filed: Feb. 7, 2005

(65) Prior Publication Data

US 2005/0198844 A1 Sep. 15, 2005

(30) Foreign Application Priority Data

Feb. 13, 2004 (KR) ............... 10-2004-0009733

(51) Int. Cl.
*G01B 5/00* (2006.01)
(52) U.S. Cl. .................. 33/1 M; 33/568; 269/903
(58) Field of Classification Search .......... 33/568, 33/569, 573, 1 M, 1 N; 269/25, 74, 111, 269/903, 289 R, 26; 451/364
See application file for complete search history.

(56) References Cited

U.S. PATENT DOCUMENTS

| | | | | |
|---|---|---|---|---|
| 4,559,717 A | * | 12/1985 | Scire et al. ............ | 33/568 |
| 4,575,942 A | | 3/1986 | Moriyama | |
| 4,667,415 A | | 5/1987 | Barsky | |
| 4,887,804 A | * | 12/1989 | Ohtsuka ................. | 269/73 |
| 5,005,298 A | * | 4/1991 | Nagasawa et al. ......... | 33/573 |
| 5,281,884 A | | 1/1994 | Basavanhally et al. | |
| 5,352,249 A | * | 10/1994 | Vollaro ................... | 29/25.01 |
| 6,252,705 B1 | | 6/2001 | Lo et al. | |
| 6,346,710 B1 | * | 2/2002 | Ue ....................... | 250/442.11 |
| 6,467,761 B1 | * | 10/2002 | Amatucci et al. ......... | 269/58 |

(Continued)

FOREIGN PATENT DOCUMENTS

JP 8-94780 4/1996

(Continued)

OTHER PUBLICATIONS

Korean Office Action issued Nov. 17, 2005 in corresponding Korean application.

*Primary Examiner*—R. Alexander Smith
(74) *Attorney, Agent, or Firm*—Stanzione & Kim, LLP

(57) ABSTRACT

A stage apparatus may include a first stage, a second stage movable with respect to the first stage, at least one flexure hinge to connect the first stage with the second stage, a plurality of actuators provided between the first stage and the second stage to push the first stage and the second stage and to be symmetric with respect to a center of the first stage and the second stage, and a controller to control the plurality of actuators to move one of the first stage and the second stage with respect to the other one of the first stage and the second stage. Thus, a position error of the stage can be reduced, which enables an ultra precision position control. Further, a piezoelectric driver using piezoelectric elements may be used as the actuator to decrease the position error more than a conventional driver such as a motor. The position error may be decreased to ±10 nm.

36 Claims, 7 Drawing Sheets

U.S. PATENT DOCUMENTS

| | | | |
|---|---|---|---|
| 6,688,183 B2 * | 2/2004 | Awtar et al. | 73/782 |
| 6,806,991 B1 * | 10/2004 | Sarkar et al. | 359/290 |
| 6,836,033 B2 * | 12/2004 | Gweon et al. | 310/12 |
| 6,920,696 B2 * | 7/2005 | Sawada et al. | 33/1 M |
| 6,935,042 B2 * | 8/2005 | Bonham et al. | 33/645 |
| 7,015,066 B2 * | 3/2006 | Tsao et al. | 438/108 |
| 2002/0194926 A1 * | 12/2002 | Awtar et al. | 73/760 |
| 2004/0163450 A1 * | 8/2004 | Gweon et al. | 73/105 |
| 2006/0064884 A1 * | 3/2006 | Seo | 33/1 M |

FOREIGN PATENT DOCUMENTS

| | | |
|---|---|---|
| JP | 1-236036 | 10/1998 |
| JP | 2003-98059 A | 4/2003 |
| KR | 10-280870 | 11/2000 |
| KR | 10-302179 | 7/2001 |
| KR | 10-381974 | 4/2003 |
| KR | 10-381975 | 4/2003 |
| KR | 2003-39169 | 5/2003 |

* cited by examiner

STAGE APPARATUS

CROSS-REFERENCE TO RELATED APPLICATIONS

This application claims the benefit of Korean Application No. 2004-9733 filed on Feb. 13, 2004, in the Korean Intellectual Property Office, the disclosure of which is incorporated herein by reference.

BACKGROUND OF THE INVENTION

1. Field of the Invention

The general inventive concept relates to a stage apparatus, and more particularly, to a stage apparatus having an improved structure to control a stage with precision.

2. Description of the Related Art

Generally, an ultra precision stage apparatus is used in a scanning device to inspect a semiconductor wafer or a liquid crystal display (LCD) that requires an ultra precision position control, a semiconductor processing apparatus and an ultra precision machining.

The stage apparatus includes a stage, such as a frame, to support a wafer of a semiconductor or the like, an actuator connected to the stage to move the stage, and a controller to control the actuator with precision.

U.S. Pat. No. 4,667,415, entitled Micro Lithograph Reticle Positioning System, discloses a conventional ultra precision stage apparatus. As shown in FIG. 1, the conventional stage apparatus includes outer frames 35 and 37 securely supported by a base, inner frames 41, 43, 45 and 47 of a rectangular shape provided inside the outer frames 35 and 37 and movable with respect to the outer frames 35 and 37, driving motors 61, 62 and 63 securely supported by a base or the like to push the inner frames 41, 43, 45 and 47, connecting rods 71, 72 and 73 to transmit driving forces of the driving motors 61, 62 and 63 to the inner frames 41, 43, 45 and 47 through corresponding holes 79, and a plurality of flexure hinges 51, 52, 53, 54, 55, 56, 57 and 58 provided between the inner frames 41, 43, 45 and 47 and the outer frames 35 and 37 to move the inner frames 41, 43, 45 and 47 on a plane in three degrees of freedom (X, Y, θ) due to the driving forces of the driving motors 61, 62 and 63.

The number of the driving motors 61, 62 and 63 is three, and the driving motors 61, 62, and 63 are provided outside a frame 33 of a rectangular shape. That is, the first driving motor 61 and the second driving motor 62 are provided outside the inner frames 41, 43, 45 and 47 and at right and left sides with respect to a center of a frame 31. The third driving motor 63 is provided outside the outer frame 37 and at the center of the outer frames 35 and 37. The first driving motor 61 and the second driving motor 62 drive the first connecting rod 71 and the connecting rod 72 to push the right and left sides of the inner frame 47, respectively. The third driving motor 63 drives the third connecting rod 73 to push the center of the inner frame 43. Here, the driving motors 61, 62 and 63 may be galvanometers.

The number of the connecting rods 71, 72 and 73 is three to correspond to the driving motors 61, 62 and 63. One side of each of the connecting rods 71, 72 and 73 is connected to a corresponding one of the driving motors 61, 62 and 63 by cranks 65, 66 and 67, and the other side of each of the connecting rods 71, 72 and 73 is connected to each of the inner frames 43 and 47.

With the configuration described above, a description of an operation of the conventional stage apparatus follows.

If the third driving motor 63 is driven, the inner frames 41, 43, 45 and 47 move along an X-axis, and if the first driving motor 61 and the second driving motor 62 are driven, the inner frames 41, 43, 45 and 47 move along a Y-axis. If the first driving motor 61 and the second driving motor 62 are driven in another way, each of the inner frames 41, 43, 45 and 47 rotates in clockwise and counterclockwise directions with respect to the center of the inner frames 41, 43, 45 and 47 in a θ direction.

However, in the conventional stage apparatus, the driving motors to produce a driving force are provided asymmetric, which causes a difficulty to reduce a position error if an ultra precision position control is required.

Further, in the conventional stage apparatus, the driving motors are used to move the frames, which have a difficulty in the ultra precision position control having a position error of tens of nm and may cause thermal deformations of the frames due to heat generated by driving the driving motors.

SUMMARY OF THE INVENTION

In order to solve the above and/or other problems, it is an aspect of the present general inventive concept to provide a stage apparatus to control a stage with precision.

Additional and/or other aspects and advantages of the general inventive concept will be set forth in part in the description that follows, and, in part, will be obvious from the description, or may be learned by practice of the invention.

The foregoing and/or other aspects of the present general inventive concept may be achieved by providing a stage apparatus that may include a first stage, a second stage movable with respect to the first stage, at least one flexure hinge to connect the first stage with the second stage, a plurality of actuators provided between the first stage and the second stage to push the first stage and the second stage and to be symmetric with respect to a center of the first stage and the second stage, and a controller to control the plurality of actuators to move one of the first stage and the second stage with respect to the other one of the first stage and the second stage.

According to an aspect of the present general inventive concept, at least one of the first stage and the second stage may include at least one guide to concentrate a pushing force of each actuator in a pushing direction.

According to another aspect of the present general inventive concept, the guide may include a pair of first cutout guides provided in at least one of the first stage and the second stage to be in the vicinity of the actuator, and to be spaced apart from each other, and to be cutout along the pushing direction of the actuator, and at least one pair of second cutout guides that are spaced apart and cutout from one of the at least one of the first cutout guides to the other one of the first cutout guides.

According to yet another aspect of the present general inventive concept, the second stage can be provided outside the first stage, and the first stage can be formed with a plurality of actuator accommodating parts to accommodate the actuators.

According to yet another aspect of the present general inventive concept, the guide can be provided in plural in the first stage and in the vicinity of each of the actuator accommodating parts.

According to still another aspect of the present general inventive concept, the stage apparatus may further include a base connected to the first stage, and the first stage may include a plurality of connecting parts connected to the base.

According to still another aspect of the present general inventive concept, the first stage may have an approximately regular hexagonal plate shape and be provided with three actuator accommodating parts to be symmetric with respect to the center of the first stage.

According to still another aspect of the present general inventive concept, the number of the flexure hinges may be six to correspond to each of sides of the first stage and to be symmetric with respect to the center of the first stage.

According to another aspect of the present general inventive concept, the controller can control the plurality of actuators to move one of the first stage and the second stage with respect to the other one of the first stage and the second stage on a plane formed by the first stage and the second stage to three degrees of freedom.

According to another aspect of the present general inventive concept, a position error of one of the first stage and the second stage with respect to the other one of the first stage and the second stage can be approximately 20±nm.

According to another aspect of the present general inventive concept, the flexure hinge can be formed by cutting parts between the first stage and the second stage and is provided in plural to be symmetric with respect to the center of the first stage and the second stage.

According to another aspect of the present general inventive concept, the flexure hinge may include an auxiliary cutting part to connect the first stage to the second stage to a predetermined width.

According to another aspect of the present general inventive concept, the auxiliary cutting part may be a T shape.

According to another aspect of the present general inventive concept, the actuator may include a piezoelectric driver including piezoelectric elements.

According to another aspect of the present general inventive concept, an end of the actuator to push the first stage may include a contacting ball.

BRIEF DESCRIPTION OF THE DRAWINGS

These and/or other aspects and advantages of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
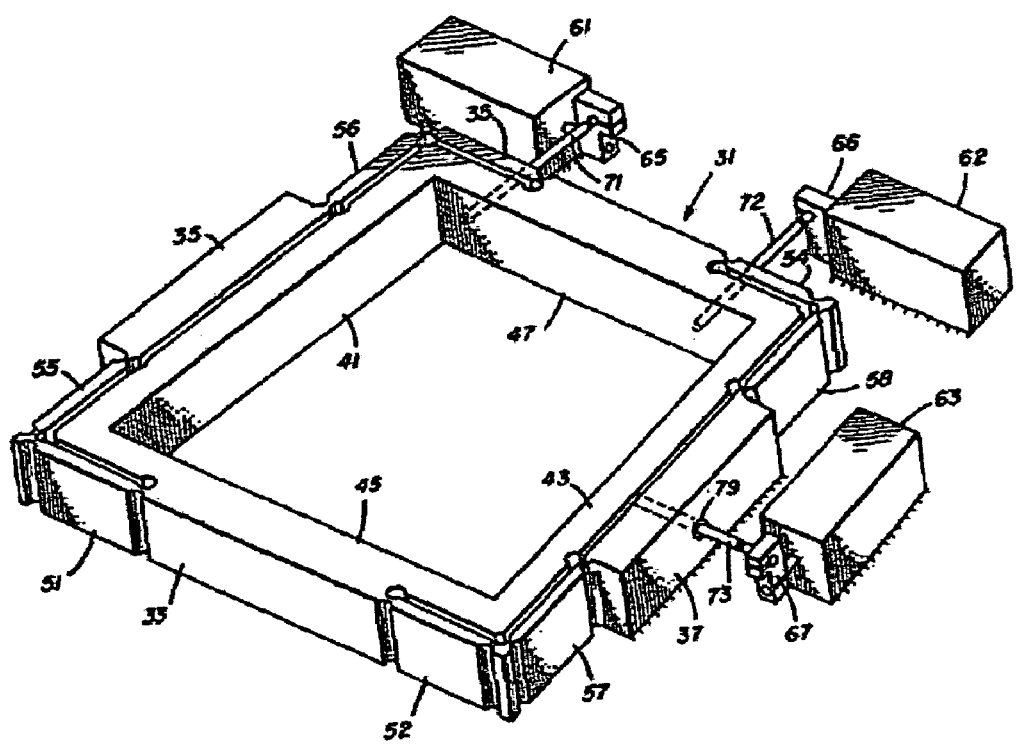
FIG. 1 is a perspective view of a conventional stage apparatus.

Reference will now be made in detail to the embodiments of the general inventive concept, examples of which are illustrated in the accompanying drawings, wherein like reference numerals refer to the like elements throughout. The embodiments are described below in order to explain the present general inventive concept by referring to the figures.

Figure 2:
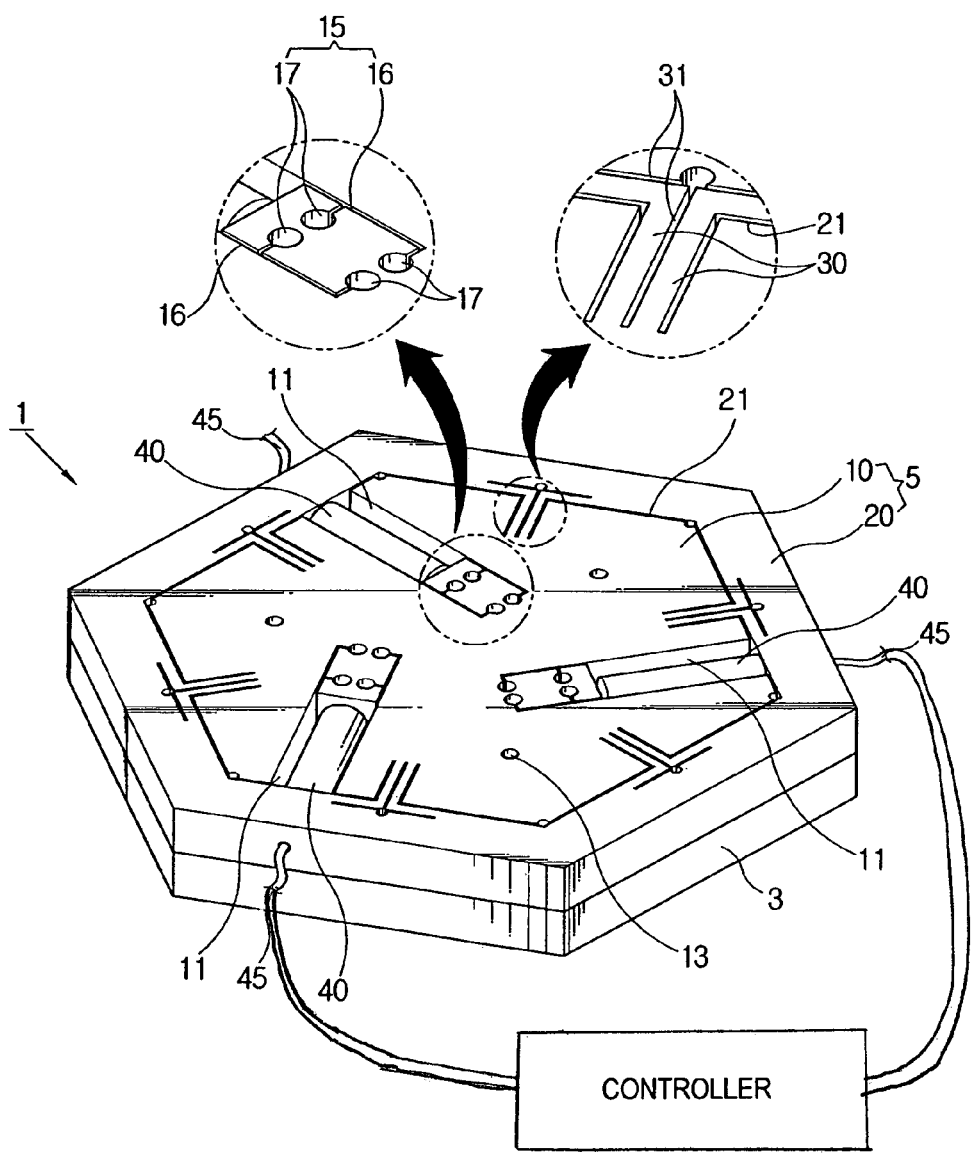
FIG. 2 is a perspective view of a stage apparatus according to an embodiment of the present general inventive concept.
Figure 3:
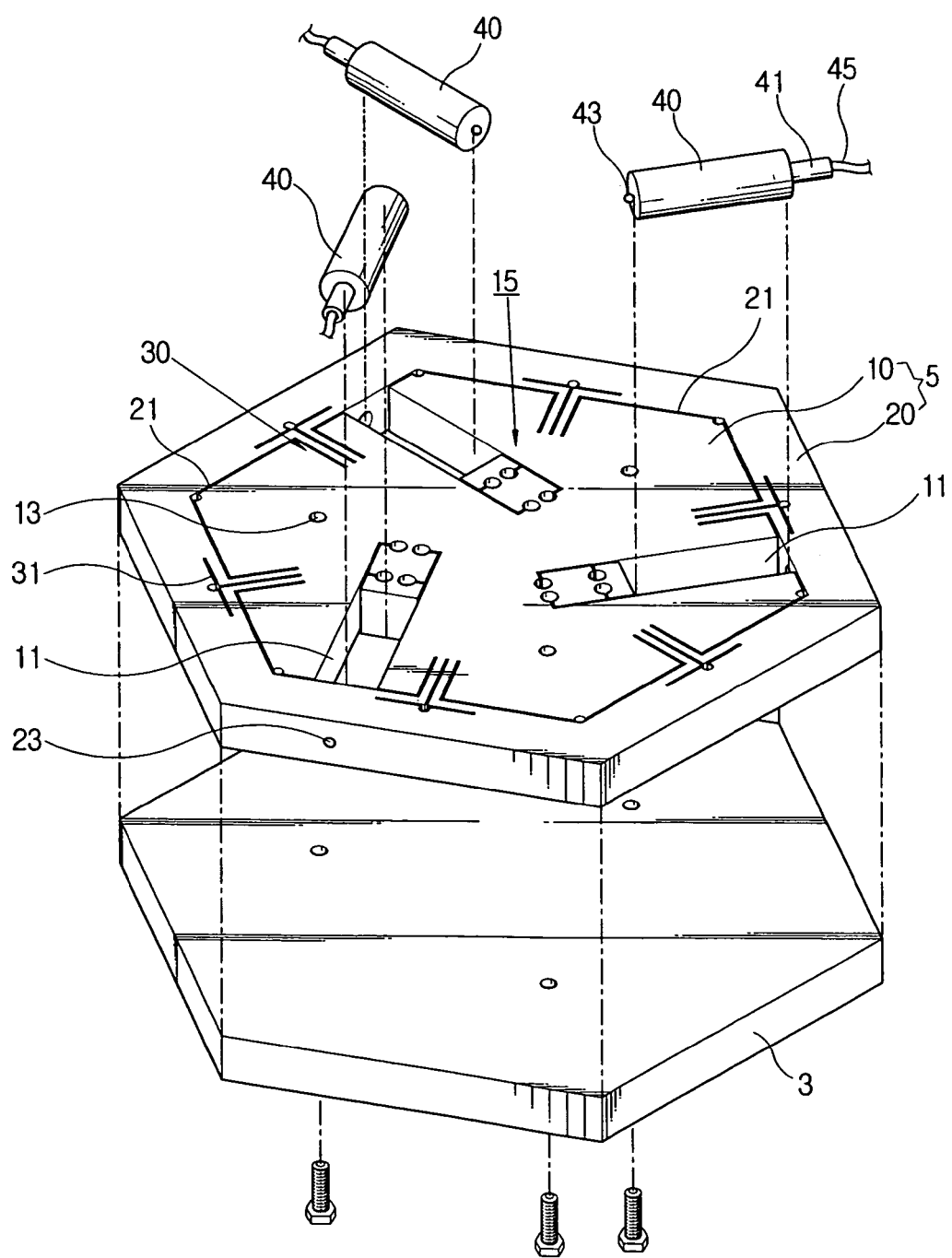
FIG. 3 is an exploded perspective view of the stage apparatus of FIG. 2.

As shown in FIGS. 2 and 3, a stage apparatus 1 according to an embodiment of the present general inventive concept may include a stage 5 having a first stage 10, a second stage 20 movable with respect to the first stage 10, at least one flexure hinge 30 to connect the first stage 10 with the second stage 20, an actuator 40 provided between the first stage 10 and the second stage 20 to push the first stage 10 and the second stage 20, and a controller (not shown) to control a plurality of actuators 40 to move one of the first stage 10 and the second stage 20 with respect to the other one of the first stage 10 and the second stage 20. The stage apparatus 1 may further include a base 3 to securely support the first stage 10 or the second stage 20.

The stage 5 can be used with a scanning device to inspect a semiconductor wafer or a liquid crystal display (LCD) that requires an ultra precision position control, a semiconductor processing apparatus and an ultra precision machining operation to support the wafer and the LCD to be examined or processed. The stage 5 according to this embodiment of the present general inventive concept can be shaped like a regular hexagonal plate but is not limited thereto. That is, the stage 5 may be formed in a shape of a circular plate or a polygonal plate, such as a triangular plate, a rectangular plate, an octagonal plate or the like. As an aspect of the present general inventive concept, the stage 5 may be in a shape symmetric with respect to a center of the stage 5. The stage 5 may include the first stage 10, the second stage 20 and the plurality of flexure hinges 30 to connect the first stage 10 with the second stage 20. At least one of the first stage 10 and the second stage 20 may be provided with at least one guide 15 to concentrate a pushing force of the actuator 40 in a direction of the pushing force.

The base 3 according to this embodiment of the present general inventive concept can be provided under the stage 5 to be connected to the first stage 10 through a connecting part 13 using a screw to securely support the first stage 10. However, the base 3 may be connected to the second stage 20 to allow the first stage 10 to move with respect to the second stage 20.

The first stage 10 of an approximate regular hexagonal shape can be provided inside the second stage 20. The first stage 10 may have a plurality of actuator accommodating parts 11 to accommodate the plurality of actuators 40 symmetric with respect to the center of the first stage 10. As an aspect of the present general inventive concept, the number of the actuator accommodating parts 11 may be three, but not limited thereto. The number of the actuator accommodating parts 11 may be six to be symmetric with respect to the center of the first stage 10. A shape of the actuator accommodating parts 11 may vary according to a shape of the first stage 10. That is, if the shape of the first stage 10 is of a square plate shape, the number of the actuator accommodating parts 11 may be four to be symmetric with respect to the center of the first stage 10. The first stage 10 has a plurality of connecting parts 13 to be connected to the base 3. In an aspect of the present general inventive concept, the number of the connecting parts 13 may be three, but not limited thereto. The number of the connecting parts 13 may be two or more than four. The number of the connecting parts 13 may be the same of the number of the actuators 40 and be symmetric with respect to the center of the first stage 10.

The second stage 20 can be connected with the first stage 10 by the plurality of flexure hinges 30 and is movable with respect to the first stage 10 by the actuator 40. The second stage 20 can be provided outside the first stage 10 and can support and transport goods, such as a wafer, to be controlled with precision. In an aspect of the present general inventive concept, the second stage 20 may include an actuator connecting part 23 to accommodate and be connected with a separate stage connecting part 41 of the actuator 40 (to be described later). The second stage 20 may include a supporter to put a wafer or the like thereon.

The guide 15 may include a pair of first cutout guides 16 provided in at least one of the first stage 10 and the second stage 20 that is in the vicinity of the actuator 40, spaced apart from each other, and cutout along the pushing direction of the actuator 40, and at least one pair of second cutout guides 17 that are spaced apart from each other and are cutout from one of the at least one of first cutout guides 16 to the other first cutout guide 16. In an aspect of the present general inventive concept, the guides 15 may be provided in plural in the first stage 10 and in the vicinity of each of the actuator accommodating parts 11. That is, the guide 15 prevents the pushing force of the actuator 40 accommodated in the actuator accommodating part 11 from being dispersed, which concentrates the pushing force of the actuator 40 in the pushing direction. Thus, the pushing force of the actuator 40 is controlled with ease.

In an aspect of the present general inventive concept, the pair of first cutout guides 16 may communicate with the actuator accommodating parts 11 of the first stage 10, but the present general inventive concept is not limited thereto. The pair of first cutout guides 16 may be provided in the vicinity of the actuator accommodating parts 11 not to communicate with the actual accommodating parts 11.

The second cutout guides 17 are cutout inwardly from the pair of first cutout guides 16. In an aspect of the present general inventive concept, the second cutout guides 17 may be provided in two pairs that are spaced apart in the pushing direction of the actuator 40. Thus, the pushing force of the actuator 40 is more efficiently prevented from being dispersed to concentrate the pushing force of the actuator 40 in the pushing direction, so that the pushing force of the actuator 40 is controlled with more ease.

The actuators 40 are provided in plural to be symmetric with respect to the center of the first stage 10 and second stage 20. According to this embodiment of the present general inventive concept, the number of the actuators 40 is three to accommodate the actuators 40 in corresponding ones of the actuator accommodating parts 11. That is, as an aspect of the present general inventive concept, the actuator 40 may be provided at the same angle, i.e., 120°, with respect to the center of the first stage 10. Each of the actuators 40 may be so provided that the pushing direction of the actuator 40 is biased from the center of the first stage 10. That is, if the pushing force of the actuator 40 is exerted in a longitudinal direction of the actuator 40, a central axis of the longitudinal direction of the actuator 40 may be biased from the center of the first stage 10. As an aspect of the present general inventive concept, each of the actuator 40 may be a piezoelectric driver including piezoelectric elements. That is, the actuator 40 may expand and contract in the longitudinal direction due to a plurality of piezoelectric elements, which pushes the first stage 10 and the second stage 20. The actuator 40 is connected to the controller (not shown) to control the amount of expansion and contraction. A side of the actuator 40 can contact the second stage 20, and the stage connecting part 41, to be inserted in the actuator connecting part 23 of the second stage 20, may be provided on an end of the side of the actuator 40. The other side of the actuator 40 may be provided with a contacting ball 43 to push the first stage 10 by contacting the first stage 10.

In an aspect of the present general inventive concept, the stage connecting part 41 may be inserted in the actuator connecting part 23 of the second stage 20 and be connected to the second stage 20 using a screw or the like. An end of the stage connecting part 41 is provided with a cable 45 connected to the controller.

The contacting ball 43 may be in point contact with the first stage 10 formed with the guide 15 to push the first stage 10. That is, the pushing force of the actuator 40 can be transferred to the first stage 10 through the contacting ball 43 which is in point contact with the stage connecting part 41 with accuracy, so that movement of the first stage 10 or the second stage 20 can be limited only on a plane formed by the stage 5.

The flexure hinge 30 can be formed by a plurality of cutting parts 21 between the first stage 10 and the second stage 20 and be provided in plural to be symmetric with respect to the center of the first stage 10 and the center of the second stage 20. The flexure hinge 30 may have a non-friction elastic force to move the second stage 20 with respect to the first stage 10 on the surface of the stage 5. The flexure hinge 30 may be called as a non-friction elastic bearing. In an aspect of the present general inventive concept, the flexure hinge 30 may include an auxiliary cutting part 31 to connect the first stage 10 and the second stage 20 in a predetermined width. The number of the flexure hinges 30 according to this embodiment of the present general inventive concept may be six to correspond to six sides of the first stage 10, and the flexure hinges 30 are symmetric with respect to the center of the first stage 10.

In an aspect of the present general inventive concept, the number of the cutting parts 21 may be six to form six flexure hinges 30. A wire cutting may be processed to form the flexure hinge 30, but the present general inventive concept is not limited thereto. Other processing methods, such as a laser or the like, may process the cutting parts 21. As an aspect of the present general inventive concept, the wire cutting may process also the actuator accommodating parts 11 and the guide 15.

The auxiliary cutting part 31 can control the elastic force of the flexure hinge 30 formed by the cutting parts 21 with more precision. In an aspect of the present general inventive concept, the auxiliary cutting part 31 may be cutout to form a T shape.

The controller can be connected to each of the actuator 40 by the cable 45. The controller can control the plurality of actuators 40 so that one of the first stage 10 and the second stage 20 moves with respect to the other one of the first stage 10 and the second stage 20 on the plane formed by the first stage 10 and the second stage 20 to three degrees of freedom. According to this embodiment of the present general inventive concept, the controller can control the actuator 40, so that the second stage 20 moves with respect to the first stage 10 securely supported by the base 3 on the plane to three degrees of freedom (X, Y, $\theta$) with only a very small position error. In an aspect of the present general inventive concept, the position error between the first stage 10 and the second stage 20 may be approximately ±20 nm, and more preferably ±10 nm. In an aspect of the present general inventive concept, a maximum moving distance of one of the first stage 10 and the second stage 20 with respect of the other one of the first stage 10 and the second stage 20 may be approximately 10~20 μm, or may be about 50 μm.

With the configuration described above, an operation of the stage apparatus 1 according to this embodiment of the present general inventive concept will be described with reference to FIGS. 4 and 5.

Figure 4:
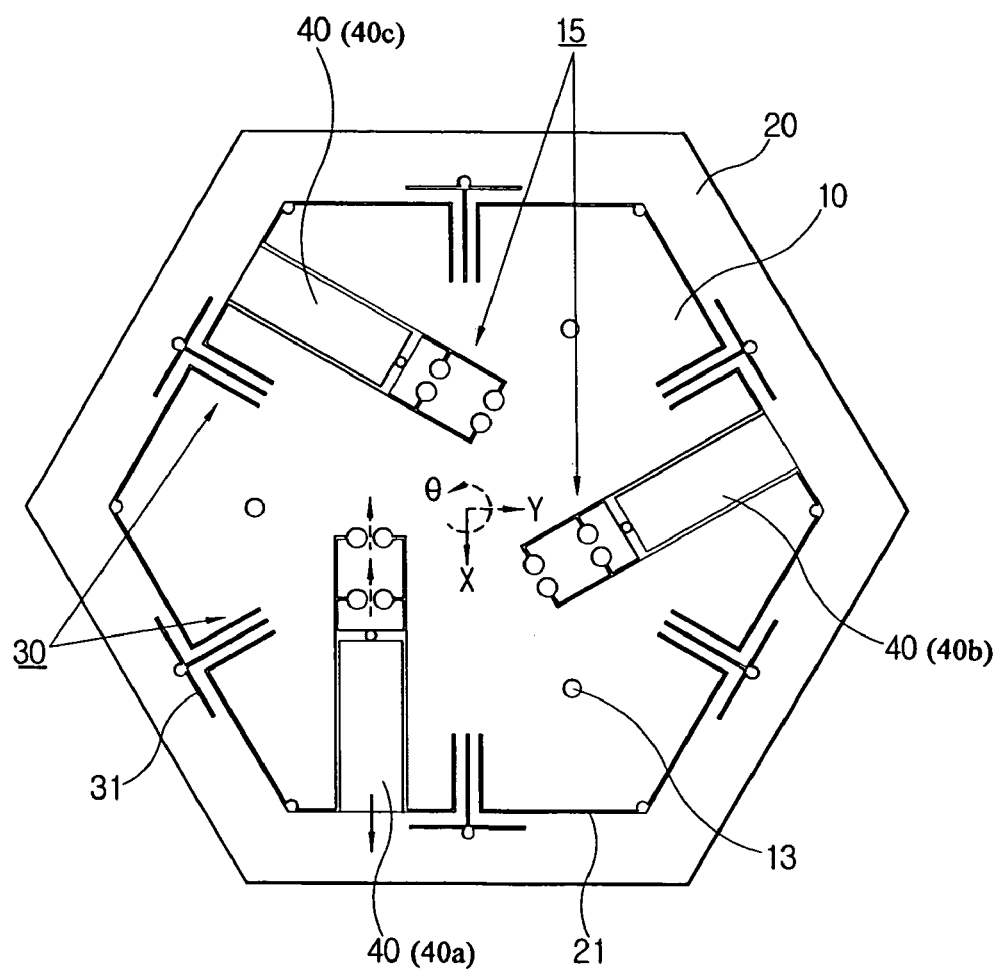
FIG. 4 is a plane view showing how a second stage moves with respect to a first stage along an X-axis in the stage apparatus of FIG. 2.

First, as shown in FIG. 4, the controller can drive the actuator 40 (40a) to exert the pushing force in the direction of the X-axis. Then, the first stage 10 securely supported by the base 3 may not move, but the second stage 20 can move with respect to the first stage 10 along the X-axis. To move the first stage 10 in a reverse direction of the X-axis, the controller may drive the remaining two actuators 40 (40b and 40c) without the actuator 40 (40a) to exert the pushing force in the direction of the X-axis, but is not limited thereto. That is, to move the second stage 20 with respect to the first stage 10 in the direction of the X-axis or the reverse direction of the X-axis, the controller may drive three of the actuators 40.

Figure 5:
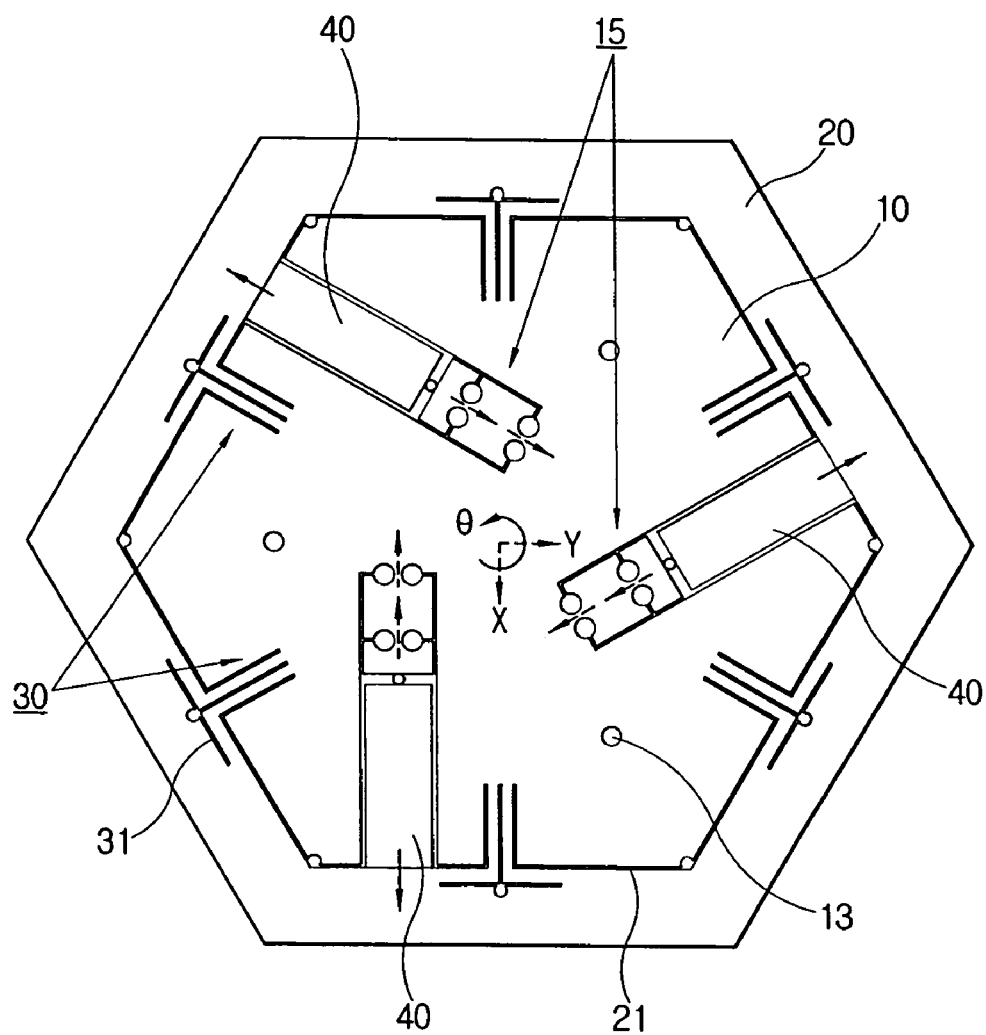
FIG. 5 is a plane view showing how a second stage moves with respect to a first stage in a θ direction in the stage apparatus of FIG. 2.

To move the second stage 20 with respect to the first stage 10 on the plane of the stage 5 along the Y-axis or to rotate the first stage 10 and the second stage 20 in the θ direction, the controller can drive three of the actuators 40 (refer to FIG. 5).

Thus, the stage apparatus 1 according to this embodiment of the present general inventive concept may include the actuators 40 to be symmetric with respect to the center of the stage, which enables the position control with ultra precision and decreases the position error with ease.

Further, the piezoelectric driver using piezoelectric elements may be used as the actuator 40 to decrease the position error more than the conventional driver, such as a motor. The position error may be decreased to ±10 nm.

Figure 6:
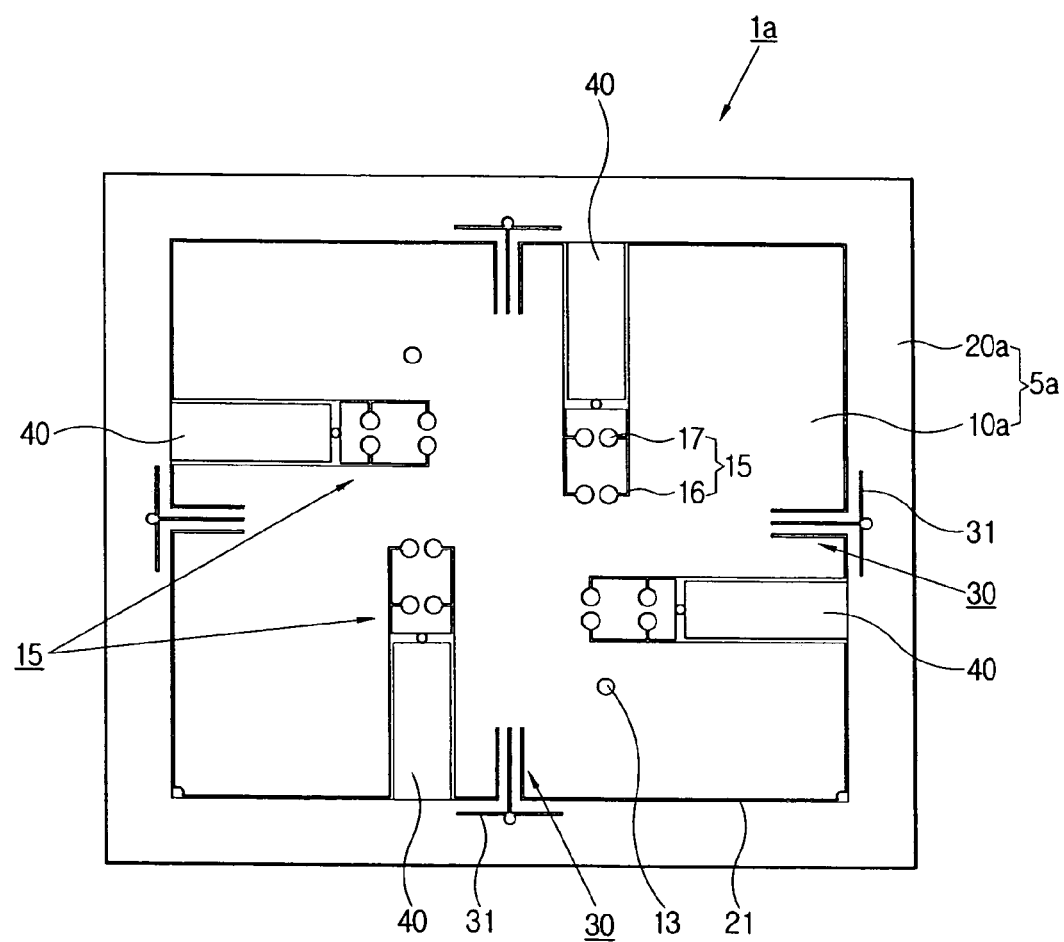
FIG. 6 is a plane view of a stage apparatus according to another embodiment of the present general inventive concept.
Figure 7:
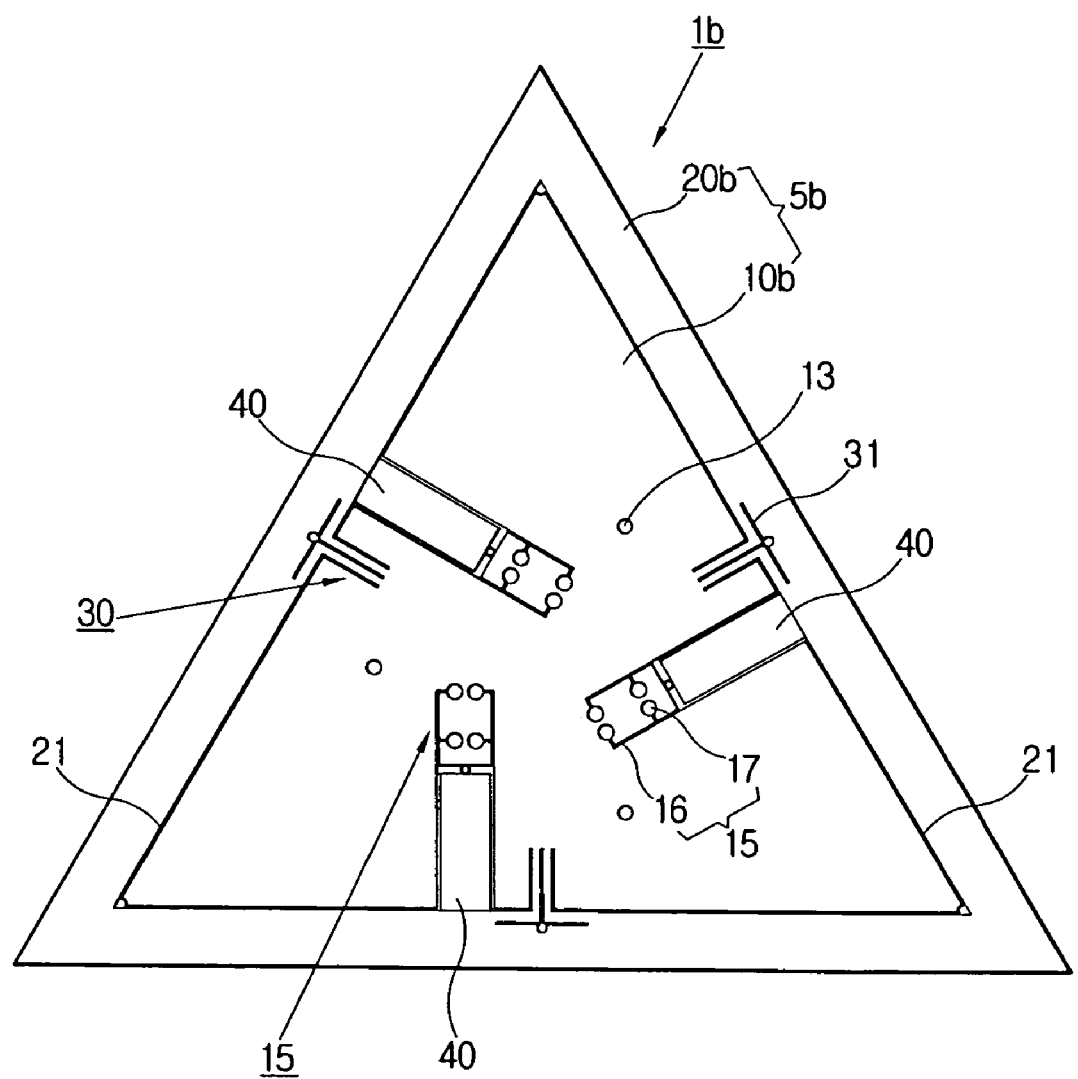
FIG. 7 is a plane view of a stage apparatus according to another embodiment of the present general inventive concept.

As shown in FIG. 6, the stage apparatus 1a according to another embodiment of the present general inventive concept may include a stage 5a having a first stage 10a and a second stage 20a and having a rectangular shape with four actuators 40, four flexure hinges 30, and four guides 15 to be symmetric with respect to a center of the stage 5a. As shown in FIG. 7, the stage apparatus 1b according to another embodiment of the present general inventive concept may include a stage 5b having a first stage 10b and a second stage 20b and having a triangular shape, three actuators 40, three flexure hinges 30, and three guides 15 to be symmetric with respect to a center of the stage 5b.

Descriptions of operations of the stage apparatuses according to the embodiments of FIGS. 6 and 7 are omitted since they are similar to the operation according to the embodiment shown in FIGS. 2 and 3.

Thus, with the configurations of the embodiments of of FIGS. 6 and 7, a position error can be reduced, which enables an ultra precision position control.

Further, the piezoelectric driver using piezoelectric elements may be used as the actuator 40, to decrease the position error more than a conventional driver such as a motor. The position error may be decreased to ±10 nm.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A stage apparatus comprising:
a first stage;
a second stage movable with respect to the first stage;
at least one flexure hinge to connect the first stage with the second stage;
a plurality of actuator accommodating parts extending from a boundary between the first and second stages into the first stage toward a center portion of the first stage;
a plurality of actuators provided in the corresponding actuator accommodating parts between the first stage and the second stage to push the first stage and the second stage and to be symmetric with respect to a center of the first stage and the second stage; and
a controller to control the plurality of actuators to move one of the first stage and the second stage with respect to the other one of the first stage and the second stage.

2. The stage apparatus according to claim 1, wherein at least one of the first stage and the second stage comprises at least one guide to concentrate a pushing force of the actuator in a pushing direction.

3. The stage apparatus according to claim 2, wherein the guide comprises:
a pair of first cutout guides provided in at least one of the first stage and the second stage, disposed in the vicinity of the actuator, spaced apart from each other, and cutout along the pushing direction of the actuator; and
at least one pair of second cutout guides that are spaced apart from each other and are cutout from one of the at least one of the first cutout guides to the other one of the first cutout guides.

4. The stage apparatus according to claim 3, wherein the second stage is provided outside the first stage.

5. The stage apparatus according to claim 4, wherein the at least one guide is provided in a plurality in the first stage and in the vicinity of each of the actuator accommodating parts.

6. The stage apparatus according to claim 4, further comprising a base connected to the first stage, wherein the first stage comprises a plurality of connecting parts connected to the base.

7. The stage apparatus according to claim 4, wherein the first stage has an approximately regular hexagonal plate shape and is provided with three actuator accommodating parts to be symmetric with respect to a center of the first stage.

8. The stage apparatus according to claim 7, wherein the number of the flexure hinges is six to correspond to each of sides of the first stage and to be symmetric with respect to the center of the first stage.

9. The stage apparatus according to claim 1, wherein the controller controls the plurality of actuators to move one of the first stage and the second stage with respect to the other one of the first stage and the second stage on a plane formed by the first stage and the second stage to three degrees of freedom.

10. The stage apparatus according to claim 1, wherein a position error of one of the first stage and the second stage with respect to the other one of the first stage and the second stage is approximately 20±nm.

11. The stage apparatus according to claim 1, wherein the flexure hinge comprises cutting parts formed between the first stage and the second stage and provided in plural to be symmetric with respect to the center of the first stage and the second stage.

12. The stage apparatus according to claim 11, wherein the flexure hinge comprises an auxiliary cutting part to connect the first stage to the second stage to a predetermined width.

13. The stage apparatus according to claim 12, wherein the auxiliary cutting part has a T shape.

14. The stage apparatus according to claim 1, wherein the actuator comprises a piezoelectric driver including piezoelectric elements.

15. The stage apparatus according to claim 14, wherein the actuator comprises a contacting ball formed at one end thereof to push the first stage.

16. The stage apparatus according to claim 1, wherein the center portion of the first stage comprises an area having a predetermined radius from a center point of the first stage.

17. The stage apparatus according to claim 1, wherein the plurality of actuators push the first stage in a direction biased from a center of the first stage.

18. The stage apparatus according to claim 1, wherein the plurality of actuators push the first stage in a plurality of directions, and one of the plurality of directions intersects with another one of the plurality of directions at a portion other than the center portion of the first stage.

19. The stage apparatus according to claim 18, wherein each boundary edge includes a flexure hinge disposed at the center thereof to connect the first stage with the second stage.

20. The stage apparatus according to claim 1, wherein the boundary between the first and second stages includes a plurality of boundary edges corresponding to the plurality of actuators, and each actuator is disposed at a position offset from a center of the corresponding boundary edge.

21. A stage apparatus comprising:
a stage having a first stage with a substantially regular polygonal shape and a second stage flexibly connected to the first stage, and the second stage having a plurality of sides to surround the first stage; and
a plurality of actuators disposed between the first stage and the second stage and extending perpendicularly from predetermined ones of the plurality of sides of the second stage into the first stage to apply a force in a direction biased from a center of the first stage to move the second stage with respect to the first stage or the first stage with respect to the second stage.

22. The stage apparatus according to claim 21, wherein each of the actuators comprises first and second ends connected to the first and second stages, respectively.

23. The stage apparatus according to claim 21, wherein each of the actuators generates a pushing force on one of the first and second stages in a direction which does not pass through a center of the first and second stages.

24. The stage apparatus according to claim 21, wherein the actuators are disposed to be symmetric with respect to a center of the first and second stages.

25. The stage apparatus according to claim 21, wherein the first stage is disposed inside the second stage and has a shape corresponding to the second stage, and the first stage comprises a plurality of actuator accommodating parts to accommodate corresponding ones of the actuators.

26. The stage apparatus according to claim 21, wherein the first stage comprises a plurality of cutout guides each contacting an end of a corresponding one of the actuators to concentrate a force in a pushing direction while preventing the force from being disperse.

27. The stage apparatus according to claim 26, wherein the corresponding one of the actuators has another end to contact the second stage, and the one end and the another end of the corresponding one of the actuators are disposed on a line which does not pass through a center of the first and second stages.

28. The stage apparatus according to claim 21, wherein the stage comprises a flexure hinge between the first and second stages to flexibly connect the first and second stages.

29. The stage apparatus according to claim 28, wherein the flexure hinge is formed on corresponding portions of a boundary between the first and second stages.

30. The stage apparatus according to claim 28, wherein the flexure hinge comprises an auxiliary cutting part.

31. The stage apparatus according to claim 30, wherein the auxiliary cutting part comprises a first portion formed along a boundary between the first and second stages and a second portion formed along a line toward a center of the stage.

32. The stage apparatus according to claim 21, wherein the actuators control the stage to generate a position error of the stage with respect to a reference plane of the stage by equal to or less than 10 nm.

33. A stage apparatus, comprising:
a first stage;
a second stage surrounding the first stage and having a boundary with the first stage;
a plurality of actuators extending from the boundary into the first stage and having pushing directions that are biased from a center of the first stage; and
a plurality of guides to concentrate a pushing force of the plurality of actuators in the pushing directions thereof, each guide including at least one pair of cutout guides provided in at least one of the first stage and the second stage, disposed in the vicinity of the actuator, spaced apart from each other, and cutout along the pushing direction of the actuator.

34. The stage apparatus of claim 33, wherein the at least one pair of cutout guides comprises:
a pair of first cutout guides provided in at least one of the first stage and the second stage, disposed in the vicinity of the actuator, spaced apart from each other, and cutout along the pushing direction of the actuator; and
at least one pair of second cutout guides that are spaced apart from each other and are cutout from one of the at least one of the first cutout guides to the other one of the first cutout guides.

35. A stage apparatus comprising:
a stage having a first stage surrounded by a second stage flexibly connected to the first stage; and
a plurality of actuators disposed between the first stage and the second stage and extending along axes that are slightly offset from a center of the first stage to move the second stage with respect to the first stage or the first stage with respect to the second stage.

36. A stage apparatus comprising:
a stage having a first stage surrounded by a second stage and having an interface therebetween; and
a plurality of actuators extending from the second stage at the interface into portions of the first stage and having a pushing direction that is biased from a center of the first stage to move the second stage with respect to the first stage or the first stage with respect to the second stage.

* * * * *